(12) United States Patent
Lewis et al.

(10) Patent No.: US 8,190,276 B2
(45) Date of Patent: May 29, 2012

(54) METHOD AND APPARATUS FOR CONTROLLING TEMPERATURE VARIATIONS IN A COMPUTER SYSTEM

(75) Inventors: Andrew J. Lewis, Litchfield, NH (US); Kenny C. Gross, San Diego, CA (US); David K. McElfresh, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 621 days.

(21) Appl. No.: 12/275,861

(22) Filed: Nov. 21, 2008

(65) Prior Publication Data

US 2010/0131120 A1    May 27, 2010

(51) Int. Cl.
*G06F 19/00*    (2006.01)
(52) U.S. Cl. ................ 700/25; 318/400.42; 361/701
(58) Field of Classification Search ............. 700/25, 700/76, 278, 299, 300, 301; 318/400.42; 714/25, 47.3; 361/701, 679.5
See application file for complete search history.

(56) References Cited

U.S. PATENT DOCUMENTS

| | | | | |
|---|---|---|---|---|
| 5,713,030 A * | 1/1998 | Evoy | ............................. | 713/322 |
| 5,844,208 A * | 12/1998 | Tustaniwskyj et al. | ........ | 219/494 |
| 6,592,328 B1 * | 7/2003 | Cahill | ........................... | 416/155 |
| 7,017,059 B2 * | 3/2006 | Law et al. | ..................... | 713/322 |
| 2002/0192078 A1 * | 12/2002 | McCallum et al. | ............ | 416/25 |
| 2003/0074591 A1 * | 4/2003 | McClendon et al. | ......... | 713/322 |
| 2003/0100959 A1 * | 5/2003 | Liu | ................................ | 700/21 |
| 2004/0264125 A1 * | 12/2004 | Cheng et al. | .................. | 361/687 |
| 2005/0071117 A1 * | 3/2005 | Escobar et al. | ............. | 702/132 |
| 2005/0217300 A1 * | 10/2005 | Cheng et al. | ................. | 62/259.2 |
| 2005/0273208 A1 * | 12/2005 | Yazawa et al. | ................ | 700/299 |
| 2006/0071623 A1 * | 4/2006 | Able et al. | .................... | 318/268 |
| 2006/0161306 A1 * | 7/2006 | Federspiel | .................... | 700/276 |
| 2006/0192046 A1 * | 8/2006 | Heath et al. | ................. | 244/12.3 |

* cited by examiner

*Primary Examiner* — Kidest Bahta
(74) *Attorney, Agent, or Firm* — Park, Vaughan, Fleming & Dowler LLP

(57) ABSTRACT

Some embodiments of the present invention provide a system that controls a temperature variation in a computer system. First, a performance parameter of the computer system is monitored. Next, a future temperature of the computer system is predicted based on the performance parameter. Then, a pitch of one or more blades in a cooling device in the computer system is adjusted based on the future temperature to control the temperature variation in the computer system.

19 Claims, 3 Drawing Sheets

METHOD AND APPARATUS FOR CONTROLLING TEMPERATURE VARIATIONS IN A COMPUTER SYSTEM

BACKGROUND

1. Field

The present invention generally relates to techniques for enhancing the performance of a computer system. More specifically, the present invention relates to a method and an apparatus that controls temperature variations in a computer system.

2. Related Art

As semiconductor integration densities within computer systems continue to increase at an exponential rate, thermal dissipation problems are become increasingly problematic. As a result, many new computer systems require more powerful fans to cool them. These more powerful fans can increase the vibrations generated in the computer system which can lead to performance problems for components in the computer system. For example, many new higher density disk drives have smaller track sizes and tighter tolerances to increase their storage capacity. However, smaller track sizes and tighter tolerances make disk drives potentially more sensitive to vibrations during operation of the computer system.

Additionally, as the operating temperatures of chip packages increase, thermal cycling effects can begin to adversely affect the reliability of computer system internals. A number of degradation mechanisms are accelerated by thermal cycling at high temperatures, including accelerated solder fatigue; interconnect fretting; differential thermal expansion between bonded materials; delamination failures; thermal conductivity mismatches between mating surfaces; differentials in the coefficients of thermal expansion between materials used in chip packages; wirebond shear and flexure fatigue; passivation cracking; electromigration failures; electrolytic corrosion; thermomigration failures; crack initiation and propagation; delamination between chip dies and molding compounds, as well as between the molding compound and the leadframe; die de-adhesion fatigue; repeated stress reversals in brackets leading to dislocations, cracks, and eventual mechanical failures; deterioration of connectors through elastomeric stress relaxation in polymers; and others.

One solution to this problem is to dampen the thermal cycling by "chip throttling" and/or "trash burning." For example, chip throttling can involve reducing processor clock frequencies when processor workloads are high, and trash burning can involve increasing processor workloads to raise the mean package temperature when workloads are low. Unfortunately, when the workload is high and chip throttling kicks in, system throughput is reduced at the time a customer application needs it the most. Moreover, this can create a "snowball" effect because when application demand is high, throughput slows down, which can cause application demand to pile up, which can cause throughput to slow down even further. Moreover, trash burning consumes electricity without doing useful computational work, which can generate greenhouse gases at some distant power plant.

Hence, what is needed is a method and system that controls temperature variations in a computer system without the above-described problems.

SUMMARY

Some embodiments of the present invention provide a system that controls a temperature variation in a computer system. First, a performance parameter of the computer system is monitored. Next, a future temperature of the computer system is predicted based on the performance parameter. Then, a pitch of one or more blades in a cooling device in the computer system is adjusted based on the future temperature to control the temperature variation in the computer system.

In some embodiments, a speed of the cooling device is controlled to avoid a resonant frequency of the computer system.

In some embodiments, the speed is constant.

Some embodiments include determining a vibrational frequency response of the computer system.

In some embodiments, a speed of the cooling device is controlled to operate near a minimum in the vibrational frequency response of the computer system.

In some embodiments, monitoring the performance parameter includes systematically monitoring and recording a set of performance parameters of the computer system, and wherein the recording process keeps track of the temporal relationships between events in different performance parameters.

In some embodiments, predicting the future temperature of the computer system includes using an autoregressive moving average to predict the future temperature of the computer system.

In some embodiments, predicting the future temperature of the computer system includes predicting the future temperature a predetermined amount of time in the future, wherein the predetermined amount of time is determined based on parameters including a thermal inertia of the computer system.

In some embodiments, the performance parameter includes at least one of: a temperature of the computer system, a current load of the computer system, and a moving history window of a load on the computer system.

In some embodiments, adjusting the pitch of one or more blades includes reversing the pitch.

In some embodiments, the cooling device includes at least one of: a cooling fan, and a liquid coolant pump.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
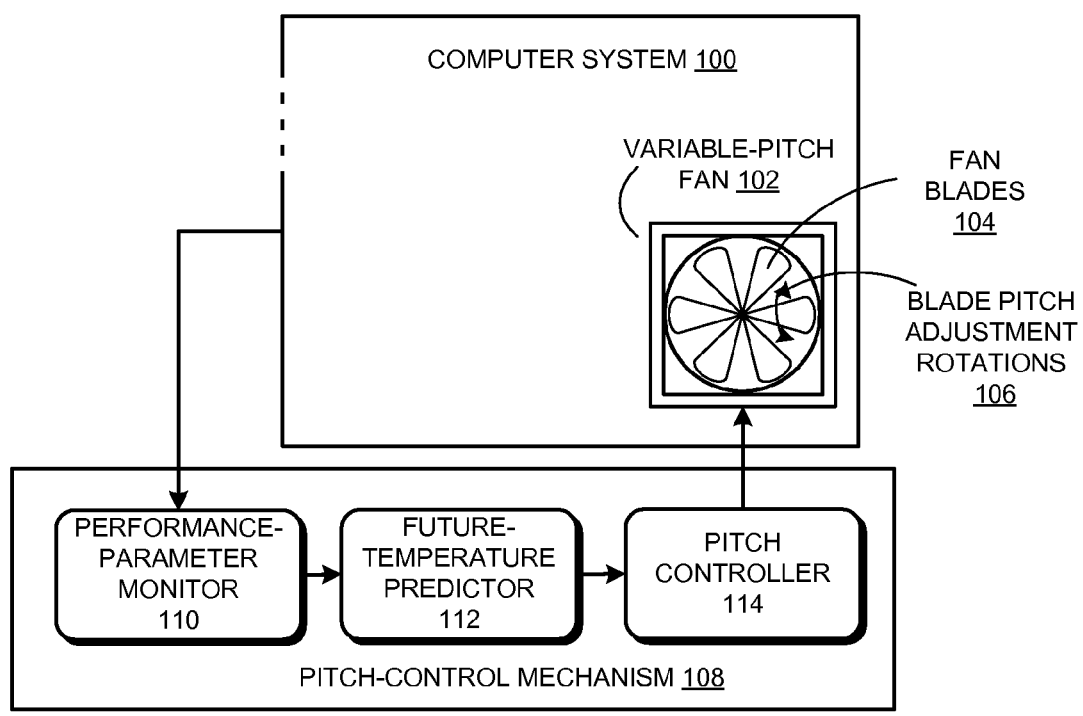
FIG. 1 represents a system that controls temperature variations in a computer system in accordance with some embodiments of the present invention.

FIG. 1 represents a system that controls temperature variations in a computer system in accordance with some embodiments of the present invention. Computer system 100 includes variable-pitch fan 102 which has six fan blades 104, each of which can be adjusted in pitch as indicated by blade pitch adjustment rotations 106. Furthermore, computer system 100 is coupled to pitch-control mechanism 108 which includes performance-parameter monitor 110, future-temperature predicator 112 and pitch controller 114.

Computer system 100 can include but is not limited to a server, a server blade, a datacenter server, a field-replaceable unit, an enterprise computer, or any other computation system that includes one or more processors and one or more cores in each processor. Note that in a multi-processor configuration, the processors can be located on a single system board, or multiple system boards.

Variable-pitch fan 102 can include any type of fan with controllable pitch fan blades that can be controlled by pitch controller 114 and used to cool computer system 100. Variable-pitch fan 102 can be implemented in any technology now known or later developed. Note that as depicted in FIG. 1 variable-pitch fan 102 includes six fan blades 104, and each of fan blades 104 can be rotated in pitch as depicted by pitch blade adjustment rotations 106. In some embodiments, variable-pitch fan 102 may include more or fewer fan blades with one or more fan blades controllable in pitch. In some embodiments, variable-pitch fan 102 can be replaced by multiple fans, one or more liquid-coolant pump with variable pitch blades that is part of a liquid cooling system for computer system 100, or any other device that can provide cooling and includes blades that can be adjusted in pitch to alter the cooling power of the device as described below. Note that in some embodiments, variable-pitch fan 102 is used to cool one or more components in computer system 100 including but not limited to one or more processors and/or power supplies.

Performance-parameter monitor 110 can be any device that can monitor performance parameters of computer system 100, including but not limited to one or more of: temperatures, currents, and/or voltages of computer system 100 or any chip (including a processor) in computer system 100; fan speeds; performance metrics, loads (including current loads), moving history window of load, throughput variables, or transaction latencies on computer system 100 or one or more processors in computer system 100; and time series of any performance parameter. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on 28 Mar. 2006, which is hereby fully incorporated by reference.

Performance-parameter monitor 110 can be implemented in any combination of hardware and software. In some embodiments, performance-parameter monitor 110 operates on computer system 100. In other embodiments, performance-parameter monitor 110 operates on one or more service processors. In still other embodiments, performance-parameter monitor 110 is located inside of computer system 100. In yet other embodiments, performance-parameter monitor 110 operates on a separate computer system. In some embodiments, performance-parameter monitor 110 includes a method or apparatus for monitoring and recording computer system performance parameters as set forth in U.S. Pat. No. 7,020,802.

Future-temperature predictor 112 can be any device that can receive input from performance-parameter monitor 110 and predict a future temperature of computer system 100 in accordance with embodiments of the present invention. In general, future-temperature predictor 112 can implement any method or apparatus now known or later developed to predict the future temperature of computer system 100 without departing from the present invention. In some embodiments, future-temperature predictor 112 implements an autoregressive moving average (ARMA) method using monitored performance parameters to predict the temperature of computer system 100 a predetermined time into the future. In some embodiments, the predetermined time is determined based on parameters including but not limited to one or more of: a thermal inertia of computer system 100 and/or one or more components in computer system 100, and the amplitude of temperature oscillations in computer system 100 and/or one or more components in computer system 100. In some embodiments, future-temperature predictor 112 predicts the temperature of one or more chips (including processors), or power supplies in computer system 100 using ARMA and monitored performance parameters for the chips or power supplies, and variable-pitch fan 102 is positioned to provide cooling for the chips or power supply.

Note that future-temperature predictor 112 can be implemented in any combination of hardware and software. In some embodiments, future-temperature predictor 112 operates on computer system 100. In other embodiments, future-temperature predictor 112 operates on one or more service processors. In yet other embodiments, future-temperature predictor 112 operates on a separate computer system. In still other embodiments future-temperature predictor 112 operates on the same hardware as performance-parameter monitor 110.

Pitch controller 114 is any device that can receive input from future-temperature predictor 112 and control the pitch of fan blades 104 in variable-pitch fan 102 using one or more blade pitch adjustment rotations 106 in response to the predicted future temperature. Moreover, future-temperature predictor 112 can be implemented in any combination of hardware and software. In some embodiments, future-temperature predictor 112 operates on computer system 100. In other embodiments, future-temperature predictor 112 operates on one or more service processors. In still other embodiments, future-temperature predictor 112 is located inside computer system 100. In yet other embodiments, future-temperature predictor 112 operates on a separate computer system.

Some embodiments of the present invention operate as follows. During operation of computer system 100, performance-parameter monitor 110 monitors performance parameters of computer system 100. Future-temperature predictor 112 then predicts a temperature of computer system 100 a predetermined amount of time in the future based on monitored performance parameters of computer system 100. Then, based on the future temperature predicted by future-temperature predictor 112, pitch controller 114 controls the pitch of fan blades 104 in variable-pitch fan 102 using one or more blade pitch adjustment rotations 106. In some embodiments, pitch controller 114 controls the pitch of fan blades 104 to change the cooling power of variable-pitch fan 102 so that the temperature of computer system 100 stays in a predetermined temperature range. For example, if the predicted future temperature of computer system 100 exceeds a predetermined temperature range maximum, then pitch controller 114 controls the pitch of fan blades 104 to increase the cooling power of variable-pitch fan 102, so that the temperature of computer system 100 stays below the predetermined temperature range maximum. Furthermore, if the predicted future temperature of computer system 100 falls below a predetermined temperature range minimum, then pitch controller 114 controls the pitch of fan blades 104 to decrease the cooling power of variable-pitch fan 102, so that the temperature of computer system 100 stays above the predetermined temperature range minimum.

Note that in some embodiments the speed of variable-pitch fan 102 is determined based on the vibration response of computer system 100 and/or one or more components in computer system 100. In some embodiments, the response of computer system 100 and/or one or more components in computer system 100, such as disk drives, is determined as a function of vibration frequency along one or more vibration axes using one or more methods and/or apparatus described in: U.S. patent application entitled "Characterizing the Response of a Device in a Computer System to Vibration Over a Frequency Range," by Dan Vacar, Anton A. Bougaev, David K. McElfresh, and Kenny C. Gross, Ser. No. 12/220,815 filed on 28 Jul. 2008, which is hereby fully incorporated by reference; U.S. patent application entitled "Characterizing the Response of a Computer System Component to Vibrations," by Anton A. Bougaev, Aleksey M. Urmanov, Kenny C. Gross, and David K. McElfresh, Ser. No. 12/228,407, filed on 11 Aug. 2008, which is hereby fully incorporated by reference; and/or U.S. patent application entitled "Characterizing the Performance of a Disk Drive Across a Range of Vibration Frequencies," by David K. McElfresh, Anton A. Bougaev, and Aleksey M. Urmanov, Ser. No. 12/264,110, filed on 3 Nov. 2008, which is hereby fully incorporated by reference.

In some embodiments, the speed of variable-pitch fan 102 is controlled to avoid a resonant frequency of computer system 100, which can include but is not limited to a vibration frequency that is at or near a local or absolute maximum of amplitude response or performance degradation of computer system 100 versus frequency for a structure or device in computer system 100. For example, in some embodiments, the speed of variable-pitch fan 102 is chosen to avoid a vibration frequency that is at or near a frequency that results in a degradation of the throughput of a disk drive in computer system 100 from the throughput of the disk drive when there is no vibration present.

In some embodiments, the speed of variable-pitch fan 102 is controlled to operate at or near a minimum in the vibrational frequency response of computer system 100, which can include but is not limited to a vibration frequency that is at or near a local or absolute minimum of amplitude response or performance degradation versus frequency for a structure or device in computer system 100. For example, in some embodiments, the speed of variable-pitch fan 102 is chosen so that vibrations generated by variable-pitch fan 102 are at or near frequencies that result in no degradation of the throughput of a disk drive in computer system 100 at the amplitude of vibrations generated by variable-pitch fan 102. In some embodiments, the speed of variable-pitch fan 102 is held constant at or near one of the local minima of amplitude response versus frequency.

Additionally, in some embodiments, the fan speed is determined based on a maximum amount of cooling required to be provided by variable-pitch fan 102. For example, the speed of variable-pitch fan 102 may be determined based on both the speed required to achieve a designed peak cooling capacity with the pitch of fan blades 104 configured for maximum cooling and the frequency location of one or more minima in performance degradation for computer system 100.

Note that some embodiments of the present invention control temperature variations of any device and/or chip (including a processor) in computer system 100. For example, in some embodiments, performance-parameter monitor 110 monitors performance parameters of a power supply in computer system 100. The monitored performance parameters are then used by future-temperature predictor 112 to predict the future temperature of the power supply. Pitch controller 114 then controls the pitch of fan blades in a variable-pitch fan in the power supply to control temperature variations in the power supply.

Furthermore, in some embodiments, pitch controller 114 can reverse the pitch of fan blades 104 in variable-pitch fan 102 in order to reverse the direction of air flow generated by variable-pitch fan 102. In some embodiments, pitch-control mechanism 108 includes a mechanism that implements one or more methods or apparatus described in U.S. patent application entitled "Method and Apparatus for Mitigating Dust-Fouling Problems," by R. J. Melanson, Kenny C. Gross, and Aleksey M. Urmanov, Ser. No. 11/773,518, filed on 5 Jul. 2007, which is hereby fully incorporated by reference. For example, in some of these embodiments, when pitch-control mechanism 108 detects that computer system 100 has become dust-fouled, then pitch controller 114 controls the pitch of fan blades 104 in variable-pitch fan 102 to reverse, reversing the flow of air generated by variable-pitch fan 102 to help dislodge and disperse dust from computer system 100.

Figure 2:
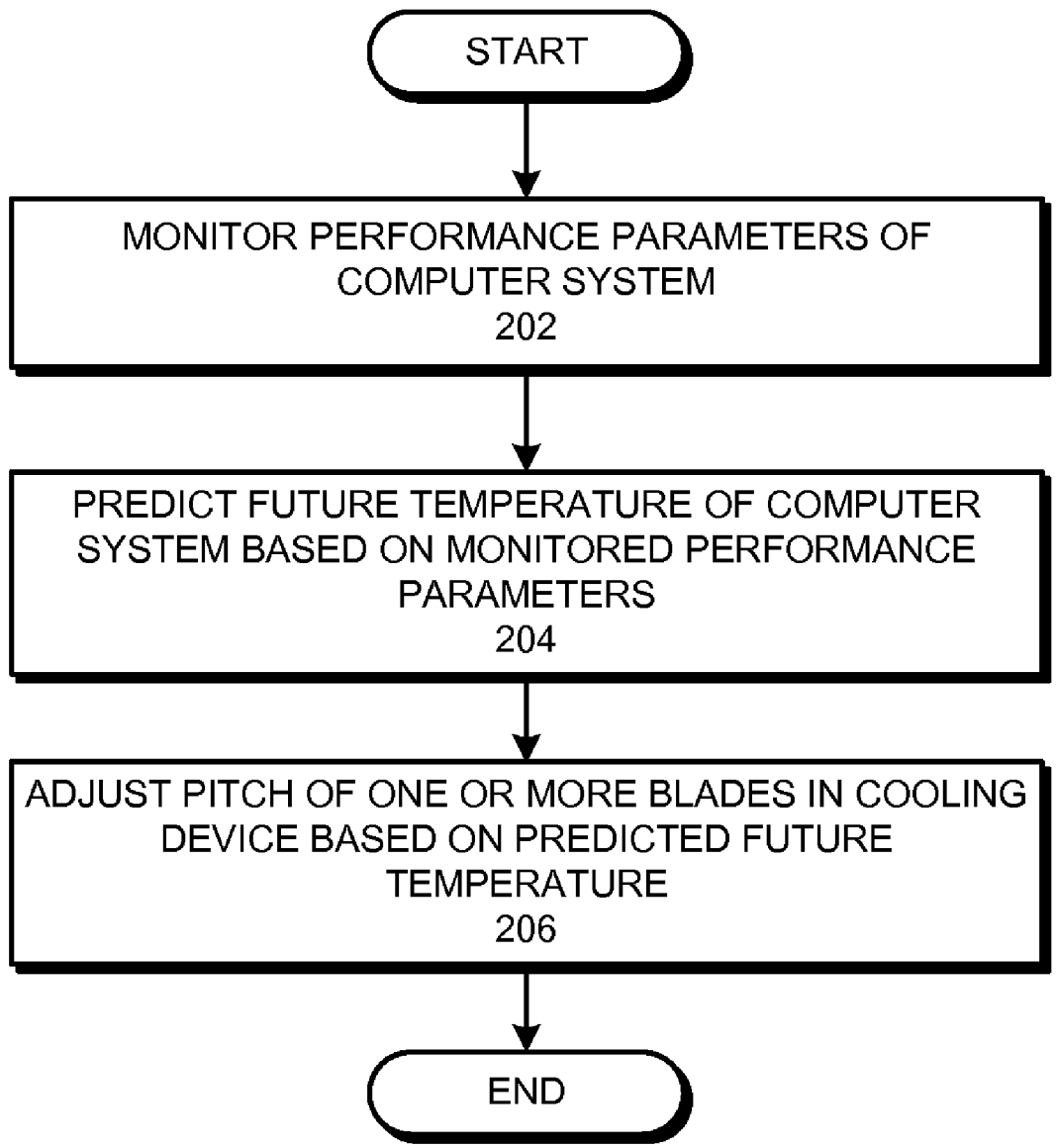
FIG. 2 presents a flow chart illustrating a process that controls temperature variations in a computer system in accordance with some embodiments of the present invention.

FIG. 2 presents a flow chart illustrating a process that controls temperature variations in a computer system in accordance with some embodiments of the present invention. First, performance parameters of the computer system are monitored (step 202). Next, the future temperature of the computer system is predicted based on the monitored performance parameters (step 204). Then, the pitch of one or more fan blades on the cooling device in the computer system is adjusted based on the predicted future temperature (step 206).

Figure 3:
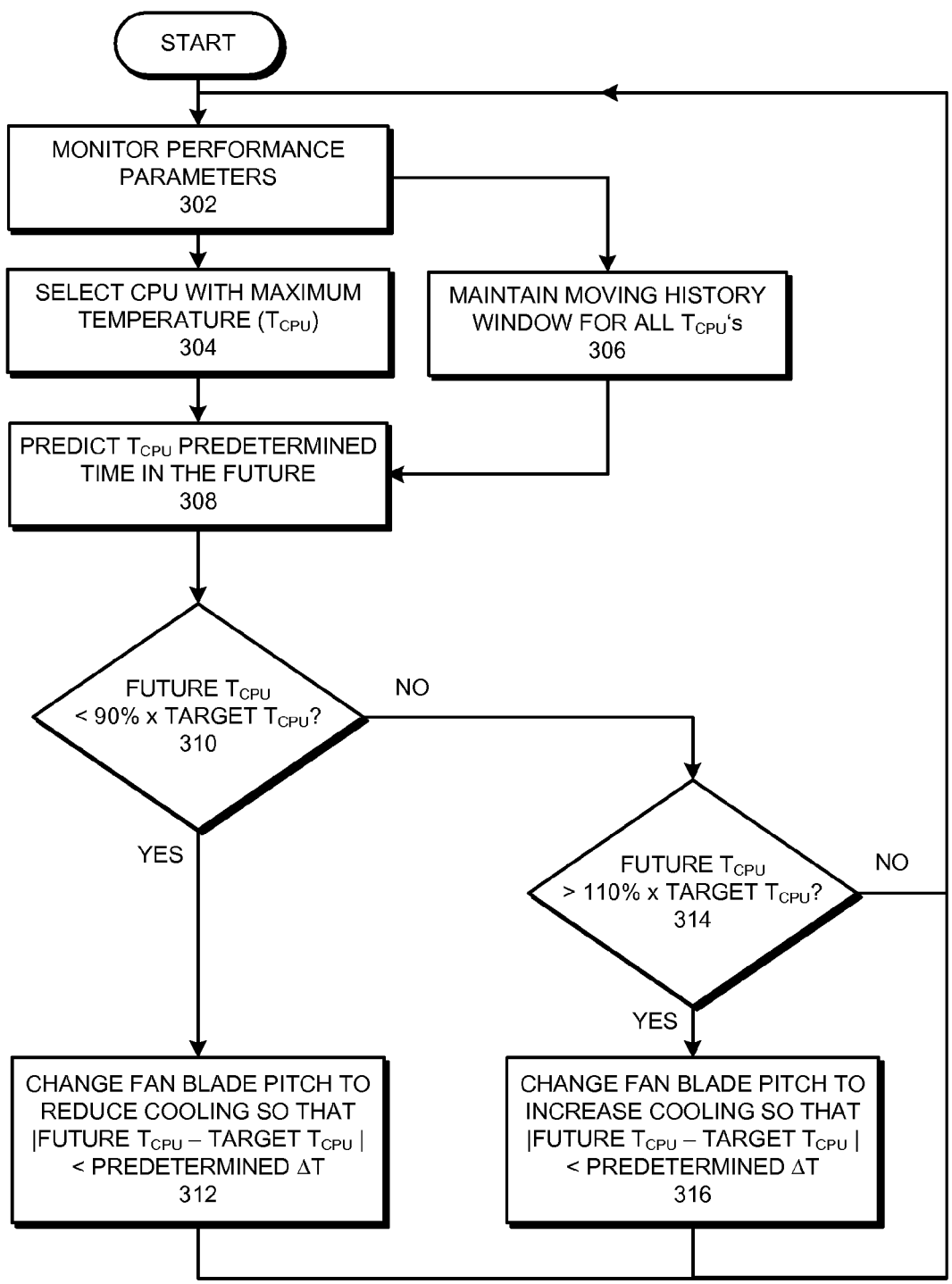
FIG. 3 presents a flow chart illustrating a process that controls temperature variations in one or more central processing units (CPUs) in a computer system in accordance with some embodiments of the present invention.

FIG. 3 presents a flow chart illustrating a process that controls temperature variations in one or more central processing units (CPUs) in a computer system in accordance with some embodiments of the present invention. First, performance parameters of the CPUs are monitored (step 302). The performance parameters for each CPU can include but are not limited to the temperature, current load, and moving history window of the load. The CPU with the maximum temperature is selected (step 304), and a moving history window for the temperature of all CPUs is maintained (step 306).

The future temperature of the selected CPU is predicted a predetermined time in the future (step 308).

If the future temperature of the CPU is less than 90% of a predetermined target CPU temperature (step 310), then the pitch of blades in the cooling device is changed so that the cooling power of the CPU cooling device is reduced so that the difference between the predicted future temperature of the CPU and the predetermined target CPU temperature is less than a predetermined temperature difference (step 312). It is noted that in some embodiments, the CPU cooling device includes a fan, and the cooling power of the fan is adjusted by adjusting the pitch of blades of the fan. The process then returns to step 302.

If the future temperature of the CPU is not less than 90% of the predetermined target CPU temperature (step 310), then the process continues to step 314. If the future temperature of the CPU is greater than 110% of the predetermined target CPU temperature (step 314), then the pitch of blades in the cooling device is changed so that the cooling power of the CPU cooling device is increased so that the difference between the predicted future temperature of the CPU and the predetermined target CPU temperature is less than the predetermined temperature difference (step 316). The process then returns to step 302. If the future temperature of the CPU is not greater than 110% of the predetermined target CPU temperature (step 314), then the process returns to step 302.

In some embodiments, steps 310 and 314 can use temperature thresholds other than 90% and 110%, respectively, of the target temperature. In other embodiments, these temperature thresholds can each be a different percentage difference from the target temperature, or based on absolute temperature differences from the target temperature. In still other embodiments, the temperature thresholds can be determined based on the smallest temperature difference that can be detected, or adjusted for by changing the fan blade pitch of the cooling device.

In still other embodiments, the temperature thresholds are selected based on parameters, including but not limited to: the thermal inertia of the CPU, a predetermined maximum amplitude of temperature fluctuations that is desirable for a CPU to be exposed to, or other telemetry variables of the CPU, including performance parameters as set forth in U.S. Pat. No. 7,020,802.

In some embodiments, the maximum allowable amplitude of temperature fluctuations is based on detrimental thermal cycling effects and their impact on the performance and reliability of the CPU. Detrimental thermal cycling effects can include but are not limited to: solder fatigue; interconnect fretting; differential thermal expansion between bonded materials; delamination failures; thermal conductivity mismatches between mating surfaces; differentials in the coefficients of thermal expansion between materials used in chip packages; wirebond shear and flexure fatigue; passivation cracking; electromigration failures; electrolytic corrosion; thermomigration failures; crack initiation and propagation; delamination between chip dies and molding compounds, as well as between the molding compound and the leadframe; die de-adhesion fatigue; repeated stress reversals in brackets leading to dislocations, cracks, and eventual mechanical failures; deterioration of connectors through elastomeric stress relaxation in polymers; and any other factors that may adversely affect performance or reliability.

In some embodiments, the temperature fluctuations for multiple CPUs can be controlled at one time. In other embodiments, the temperature fluctuations can be controlled for the entire computer system or a portion thereof, including any system, sub-system, component, device, or other physical or logical segments within the computer system or any combination thereof. Additionally, in some embodiments, the computer system includes multiple fans and/or multiple partitions or zones that are each cooled by one or more fans, and temperature fluctuations can be controlled as described above by controlling the pitch of fan blades on one or more of the multiple fans in one or more of the multiple partitions or zones.

In some embodiments, the predetermined amount of time in the future that the temperature is predicted for in step 308 can be selected based on factors, including but not limited to: thermal inertia of the CPU, or telemetry variables of the CPU including performance parameters of the system, as set forth in U.S. Pat. No. 7,020,802. In other embodiments, methods other than those involving the autoregressive moving average can be used to predict the future temperature.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for controlling a temperature variation in a computer system, the method comprising:
   monitoring a performance parameter of the computer system;
   predicting a future temperature of the computer system based on the performance parameter; and
   adjusting a pitch of one or more blades in a cooling device in the computer system based on the future temperature to control the temperature variation in the computer system, wherein adjusting the pitch comprises reversing a flow of air generated by the cooling device by reversing the pitch of the one or more blades.

2. The method of claim 1, wherein a speed of the cooling device is controlled to avoid a resonant frequency of the computer system.

3. The method of claim 2, wherein the speed is constant.

4. The method of claim 1, further including:
   determining a vibrational frequency response of the computer system.

5. The method of claim 4, wherein a speed of the cooling device is controlled to operate near a minimum in the vibrational frequency response of the computer system.

6. The method of claim 1,
   wherein monitoring the performance parameter includes systematically monitoring and recording a set of performance parameters of the computer system,
   wherein the recording process keeps track of the temporal relationships between events in different performance parameters.

7. The method of claim 1, wherein predicting the future temperature of the computer system includes using an autoregressive moving average to predict the future temperature of the computer system.

8. The method of claim 1, wherein predicting the future temperature of the computer system includes predicting the future temperature a predetermined amount of time in the future, wherein the predetermined amount of time is determined based on parameters including a thermal inertia of the computer system.

9. The method of claim 1, wherein the performance parameter includes at least one of:
   a temperature of the computer system;

a current load of the computer system; and a moving history window of a load on the computer system.

10. The method of claim 1, wherein the cooling device includes at least one of:

a cooling fan; and a liquid coolant pump.

11. The method of claim 1, wherein reversing the flow of air facilitates dislodging dust in the computer system.

12. A computer-readable storage medium storing instructions that when executed by a computer cause the computer to perform a method for controlling a temperature variation in a computer system, the method comprising:

monitoring a performance parameter of the computer system;

predicting a future temperature of the computer system based on the performance parameter; and adjusting a pitch of one or more blades in a cooling device in the computer system based on the future temperature to control the temperature variation in the computer system, wherein adjusting the pitch comprises reversing a flow of air generated by the cooling device by reversing the pitch of the one or more blades.

13. The computer-readable storage medium of claim 12, wherein a speed of the cooling device is controlled to avoid a resonant frequency of the computer system.

14. The computer-readable storage medium of claim 13, wherein the speed is constant.

15. The computer-readable storage medium of claim 12, further including:

determining a vibrational frequency response of the computer system, wherein a speed of the cooling device is controlled to operate near a minimum in the vibrational frequency response of the computer system.

16. The computer-readable storage medium of claim 12, wherein monitoring the performance parameter includes systematically monitoring and recording a set of performance parameters of the computer system, wherein the recording process keeps track of the temporal relationships between events in different performance parameters.

17. The computer-readable storage medium of claim 12, wherein predicting the future temperature of the computer system includes using an autoregressive moving average to predict the future temperature of the computer system.

18. The computer-readable storage medium of claim 12, wherein predicting the future temperature of the computer system includes predicting the future temperature a predetermined amount of time in the future, wherein the predetermined amount of time is determined based on parameters including a thermal inertia of the computer system.

19. An apparatus that controls a temperature variation in a computer system, the apparatus comprising:

a monitoring mechanism configured to monitor a performance parameter of the computer system, wherein monitoring the performance parameter includes systematically monitoring and recording a set of performance parameters of the computer system, and wherein the recording process keeps track of the temporal relationships between events in different performance parameters;

a predicting mechanism configured to predict a future temperature of the computer system based on the performance parameter; and an adjusting mechanism configured to adjust a pitch of one or more blades in a cooling device in the computer system based on the future temperature to control the temperature variation in the computer system, wherein, while adjusting the pitch, the adjusting mechanism is configured to reverse a flow of air generated by the cooling device by reversing the pitch of the one or more blades.

* * * * *